(12) United States Patent
Hombo et al.

(10) Patent No.: US 8,684,670 B2
(45) Date of Patent: Apr. 1, 2014

(54) SEALING MECHANISM WITH BELLOWS AND STEAM TURBINE PROVIDED WITH THE SEALING MECHANISM

(75) Inventors: Ryokichi Hombo, Tokyo (JP); Tamiaki Nakazawa, Tokyo (JP); Rimpei Kawashita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 384 days.

(21) Appl. No.: 12/958,847

(22) Filed: Dec. 2, 2010

(65) Prior Publication Data

US 2011/0236205 A1 Sep. 29, 2011

(30) Foreign Application Priority Data

Mar. 25, 2010 (JP) ................................. 2010-070027

(51) Int. Cl.
*F01D 25/04* (2006.01)
(52) U.S. Cl.
USPC ........................................ 415/119; 415/213.1
(58) Field of Classification Search
USPC ............ 415/119, 214.1, 213.1; 277/634–636; 92/37
See application file for complete search history.

(56) References Cited

U.S. PATENT DOCUMENTS

| 3,051,515 A * | 8/1962 | Graves | 285/228 |
| 4,710,050 A * | 12/1987 | Larsen | 403/51 |
| 2004/0120835 A1 | 6/2004 | O'Hara | |
| 2011/0014031 A1 | 1/2011 | Kawashita et al. | |

FOREIGN PATENT DOCUMENTS

| JP | 10-504111 | 4/1998 |
| JP | 2003-56308 | 2/2003 |
| JP | 2009-235971 | 10/2009 |
| WO | 2004/008007 | 1/2004 |

OTHER PUBLICATIONS

International Preliminary Report on Patentability and Written Opinion of the International Searching Authority issued Sep. 25, 2012 in International (PCT) Application No. PCT/JP2010/069269 with English translation.
Extended European Search Report issued Oct. 22, 2013 in corresponding European Patent Application No. 10848467.6.
Korean Office Action, with English translation, issued Oct. 21, 2013 in corresponding Korean Patent Application No. 10-2012-7020052.

* cited by examiner

*Primary Examiner* — Edward Look
*Assistant Examiner* — Maxime Adjagbe
(74) *Attorney, Agent, or Firm* — Wenderoth, Lind & Ponack, L.L.P.

(57) ABSTRACT

A sealing mechanism includes a pair of space forming rings which face each other and are configured for surrounding a shaft body, an outer bellows-joint having one end connected to an outer periphery of one of the space forming rings and another end connected to an outer periphery of the other of the space forming rings, and an inner bellows-joint having one end connected to an inner periphery of one of the space forming rings and another end connected to an inner periphery of the other of the space forming rings. Each of the inner bellows-joint and the outer bellows-joint is a corrugated plate. The space forming rings space the inner bellows-joint and the outer bellows-joint apart from each other such that the inner bellows-joint and the outer bellows-joint do not come in contact with each other.

16 Claims, 5 Drawing Sheets

SEALING MECHANISM WITH BELLOWS AND STEAM TURBINE PROVIDED WITH THE SEALING MECHANISM

BACKGROUND OF THE INVENTION

1. Field of the Invention

The present invention relates to a sealing mechanism that is suitably applied to a rotor shaft system of the steam turbine and the like; thereby, the natural frequencies regarding the sealing mechanism can be easily determined; and, the vibration resonance between the mechanism and the rotor shaft system can be easily prevented. The present invention also relates to a steam turbine provided with the sealing mechanism.

2. Background of the Invention

A steam turbine is provided with an outer turbine casing, and an inner turbine casing inside the outer casing; in the center part of the inner casing, a rotor is rotation freely installed as apart of the rotor shaft. A plurality of rotor blades (a cascade of rotor blades) is fixed to the predetermined positions (locations of the cascades) along the longitudinal direction of the rotor shaft; thereby, the positions are arranged so that the distance between a position and the adjacent position is set in advance. On the other hand, a plurality of stator blades (a cascade of stator blades) is fixed to a stator blade circular-cylinder fixed to the inner casing so that a cascade of stator blades is placed between a cascade of rotor blades and the adjacent cascade of rotor blades. Thus, a cascade rotor blades and a cascade of stator blades are placed in turn in a multi-stage arrangement, so that the cascades of rotor blades and the cascades of stator blades form a steam flow passage; a steam inlet port is provided at the inner casing as well as the outer casing; the steam entering the steam inlet port streams through the steam flow passage so as to rotate the rotor and drive a generator coupled with the rotor shaft.

The rotor is rotation-freely supported by a bearing housing that is placed outside of the outer turbine casing regarding the steam turbine; the bearing housing is placed outside of the outer casing and fixed on a foundation made of concrete or the like. A part of the rotor shaft part between the bearing housing and the outer casing is covered with a gland (shaft seal part) provided so as to prevent steam from leaking outside; the gland is supported by the bearing housing via a connecting member; in usual practices, a part of low pressure steam that has been used for rotating the rotor and is discharged from the inside of the inner casing is guided to the gland.

Further, in order not to relieve the steam outside from the space around the rotor between the outer turbine casing and the gland, at least one bellows joint of a cylindrical corrugated shape is provided between the outer casing and the gland, so as to surround the rotor shaft; thereby, the bellows joint is able to absorb the relative displacement between the outer casing and the gland, the relative displacement being caused by thermal expansion or working pressure. Incidentally, to make sure, it is noted that the corrugation shape can be seen in a cross-section passing through the axis of the cylindrical shape, but not in a cross-section perpendicular to the axis.

Figure 4:
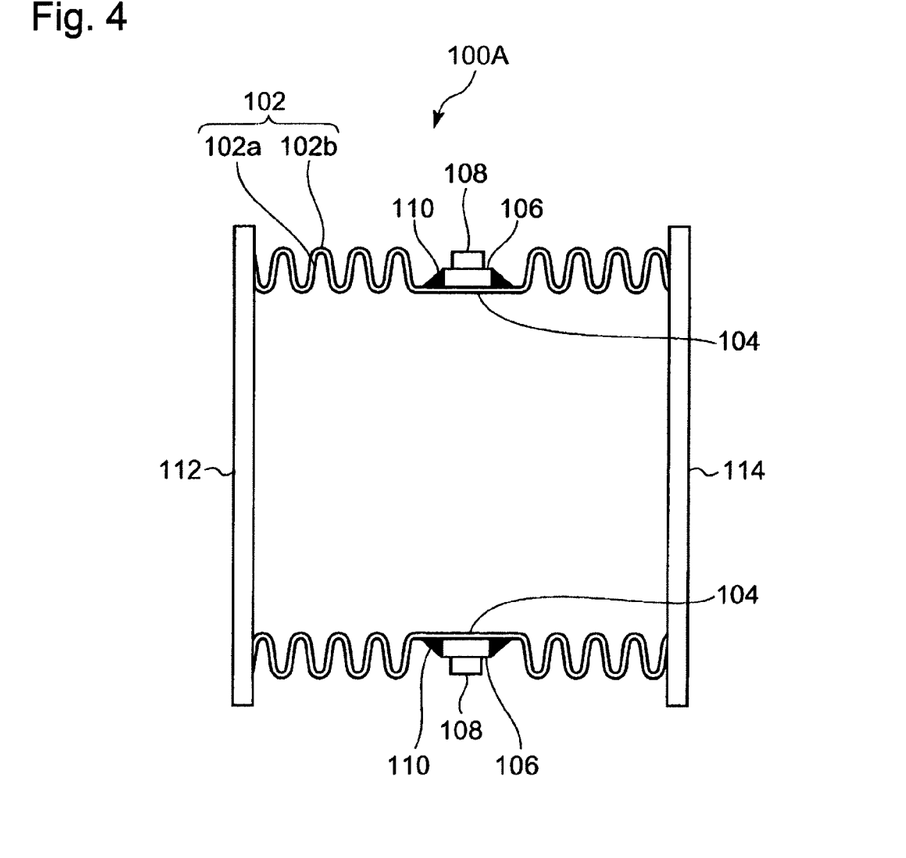
FIG. 4 shows a cross-section regarding the sealing mechanism according to the conventional technology.

JP 2009-235971 (herein referred to as "Patent Reference") discloses a sealing mechanism configured with the bellows-joint arranged between the outer turbine casing and the gland. The sealing mechanism disclosed by Patent Reference is hereby explained with reference to FIGS. 4 and 5 attached in this specification. In the sealing mechanism 100A as shown in FIG. 4, a bellows-joint 102 (comprising an inner bellows-joint and an outer bellows-joint) of a double layer structure form a cylindrical corrugated shape so as to surround a space around a rotor shaft (not shown in FIGS. 4 and 5). The bellows-joint 102 are provided so as to connect a ring-shaped end flange 112 to a ring-shaped end flange 114; thereby, the ring-shaped end flange 112 is connected to an outer turbine casing (not shown in FIGS. 4 and 5), while the ring-shaped end flange 114 is connected to a gland (not shown in FIGS. 4 and 5); the bellows joint 102 gas-tightly seals the space around the rotor shaft between the outer casing and the gland prevent steam from leaking outside.

For instance, a steam turbine installed in a nuclear power plant is provided the double layer type bellows-joint (comprising an inner bellows-joint and an outer bellows-joint), from a safety point of view.

The bellows-joint 102 comprises an inner bellows-joint 102a and an outer bellows-joint 102b, both the bellows-joints 102a and 102b having a flat (cylindrical) part 104. The inner bellows-joint and the outer bellows-joint are formed or manufactured from two cylindrical tubes; the space inside the two superposed tubes is pressurized from the inside toward the outside so that the outer tube and the inner tube are together pressed onto a forging template. On the outer periphery surface of the flat part regarding the outer bellows-joint, a rib 106 of a ring shape is fastened; on the outer periphery surface of the rib 106, a plurality of holes is provided so that a plurality of weights 108 is inserted therein in order that the rib 106 and the weights 108 configure a vibration control means. Arranging the number of the weights 108 as well as arranging the mass of each weight enables the natural frequencies of the bellows-joint 102 to be adjusted; thus, the resonance between the rotor shaft system vibration and the bellows vibration can be evaded.

Figure 5:
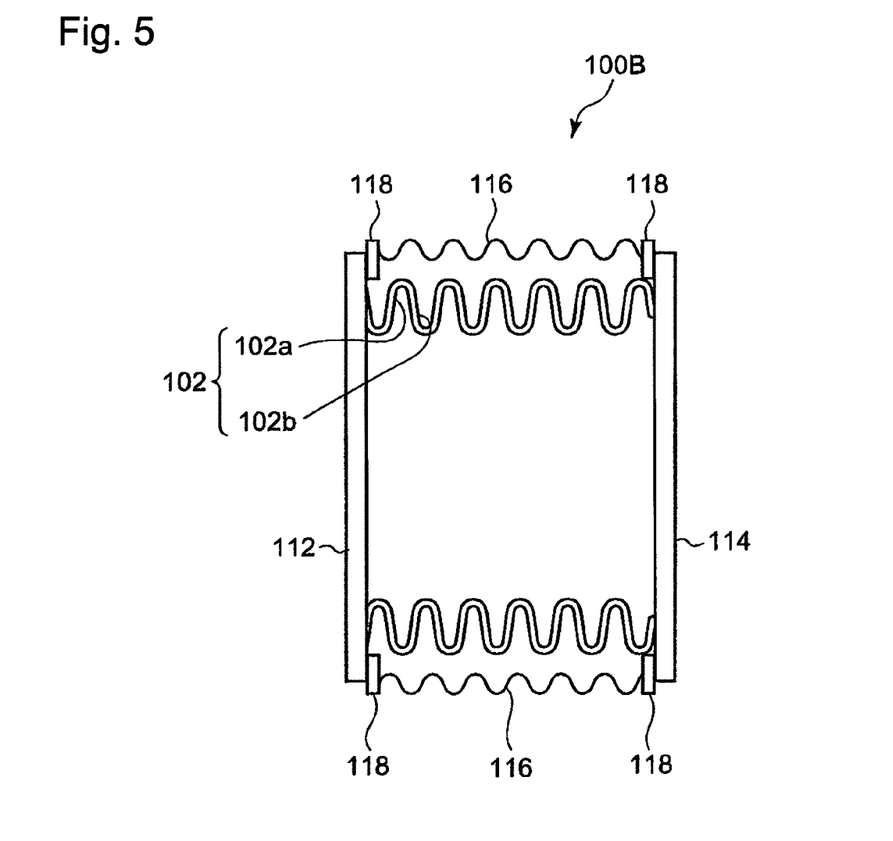
FIG. 5 shows a cross-section regarding another sealing mechanism according to the conventional technology.

Patent Reference discloses another configuration example regarding the bellows-joint as shown in FIG. 5; whereby, a sealing mechanism 100B is provided with a bellows-joint 102 comprising an inner bellows-joint 102a and an outer bellows-joint 102b, both the bellows 102a and 102b not having a flat (cylindrical) part, and a bellows-joint 116 being arranged outside of the bellows-joint 102. In addition, both the left and right ends of the bellows-joint 116 are connected an end flange 112 or 114 via a supporting member 118. In this disclosure (Patent Reference), providing the bellows-joint 116 enables the natural frequencies of the sealing mechanism 100B to be adjusted.

REFERENCES

Patent References

Patent Reference: JP 2009-235971

SUMMARY OF THE INVENTION

The natural frequencies of the bellows-joint provided at the gland depends on the stiffness or the flexibility of the bellows-part; in the sealing mechanisms 100A and 100B disclosed by Patent Reference, the gap between the inner bellows-joint 102a and the outer bellows-joint 102b is so narrow that the two bellows-joints stay in closer touch with each other. Thus, based on the degree of the contact as to the joints at the time when the joints are manufactured, the natural frequencies of the bellows-joints in the double layer structure varies structure by structure. Accordingly, it is difficult to set the natural frequencies as a desirable property. As a result, it becomes difficult to establish the natural frequencies of the sealing mechanism so as to evade the resonance between the sealing mechanism and the steam turbine rotor system.

Hence, in conventional practices, vibration tests to confirm the natural frequencies are required for each individual turbine. In some cases, it becomes necessary to re-arrange the natural frequencies or re-manufacture the sealing mechanism (or the bellows-joints); thus, the process of installing the sealing mechanism needs surplus time and labor.

In order to overcome the above-described difficulties, in the sealing mechanism 100A of Patent Reference, the rib 106 and the weight 108 are provided; namely, the rib 106 and the weight 108 form a vibration adjusting means for adjusting the natural frequencies of the sealing mechanism 100A. Providing this vibration adjusting means needs surplus time and labor.

Further, in the sealing mechanism 100B, the third bellows-joint 116 for adjusting the natural frequencies of the sealing mechanism 100B is provided outside of the bellows-joint 102 of a double layer structure; in this case, however, it becomes necessary that the integrated part of the bellows-joint 116 and the supporting members 118 be divided into two pieces (semi-cylinder pieces or tunnel-shaped pieces) so that the two pieces cover the bellows-joint 102 from outside; this configuration also requires surplus time and labor.

In view of the above-described difficulties in the conventional technology, the present invention aims at providing a sealing mechanism free from surplus time and labor in manufacturing or providing the sealing mechanism; thereby, the natural frequencies regarding the sealing mechanism surrounding a to-be-sealed shaft body are easily handled. More concretely, the present invention aims at providing a sealing mechanism including bellows-joints as well as providing a steam turbine having the sealing mechanism.

In order to achieve the objectives, the present invention provides a sealing mechanism comprising a bellows-joint surrounding a to-be-sealed shaft body and connected to a pair of support members arranged around the to-be-sealed shaft body on both ends thereof, the sealing mechanism hermetically sealing an area around the to-be-sealed shaft body while absorbing relative displacement between the pair of support members, wherein the bellows-joint includes an outer bellows-joint and an inner bellows-joint nested in the outer bellows-joint so that the inner and outer bellows-joints are arranged concentrically with respect to the to-be-sealed shaft body, each of the outer and inner bellows-joints is manufactured by corrugating a metal plate, and the outer and inner bellows-joints are arranged so as not to come in contact with each other.

As described above, in the sealing mechanism according to the present invention, the outer and inner bellows-joints are arranged so as not to come in contact with each other. Thus, it is not necessary to take the degree of the contact into consideration. Therefore, the natural frequencies of the sealing mechanism can be easily computed, and designing or handling the natural frequencies regarding the sealing mechanism becomes easy and simple. Accordingly, surplus time and labor in adjusting natural frequencies can be dispensed with. Further, vibration tests to confirm the natural frequencies can be also dispensed with; in addition, the expenditure for performing the vibration tests can be remarkably reduced; moreover, surplus labor and expenditure for re-manufacturing the bellows-joint can be dispensed with.

The sealing mechanism disclosed by Patent Reference is provided with the special means for adjusting the natural frequencies or vibration properties; on the contrary, according to the present invention, it is unnecessary to provide such a special adjusting means; further, the sealing performance of the present invention is not inferior to that of the Patent Reference.

Further, in the sealing mechanism disclosed by Patent Reference as depicted in FIG. 5, the outer bellows-joint 116 that is placed outside of the bellows-joint 102 has to be divided into at least two pieces (e.g. two semi-cylinder pieces or two tunnel-shaped pieces) so that the outer bellows-joint 116 surrounds the bellows-joint 102. On the contrary, according to the present invention, the outer bellows-joint and the inner bellows-joint are arranged so that the inner bellows-joint is placed inside of the outer bellows-joint in a nesting condition; namely, it is unnecessary to divide the outer bellows-joint into two or more pieces. Thus, the sealing mechanism according to the present invention is far easily manufactured than that according to Patent Reference.

Preferably, the above-described sealing mechanism further comprises a pair of space forming rings respectively arranged on end surfaces of the support members facing with each other so as to surround the to-be-sealed shaft body, the outer bellows-joint being connected to outer periphery of each of the pair of space forming rings, the inner bellows-joint being connected to inner periphery of each of the pair of space forming rings.

In this way, the outer and inner bellows-joints are secured to the support members via the space forming rings. Therefore, it is easy to secure the outer and inner bellows-joints to the support members so that the outer and inner bellows-joints have a gap therebetween.

Preferably, the above-described sealing mechanism is applied to a gland of a steam turbine. Specifically, the to-be-sealed shaft body may be a rotor shaft of a steam turbine including an outer turbine casing and a gland, and the pair of support members may be the turbine casing and the gland; and the outer and inner bellows-joints are hermetically provided between the outer turbine casing and the gland so as to hermetically seal an area around the rotor shaft.

In this way, the natural frequencies of the sealing mechanism can be adjusted in a simple manner without surplus expenditure in time and labor; and, the resonance between the sealing mechanism and the rotor shaft system can be easily avoided.

Preferably, at least one of plate thickness, the number of corrugations, pitch of the corrugations and material of the outer and inner bellows-joints is selected so that natural frequency requirements and environment conditions are satisfied.

In this way, the plate thickness, the number of the corrugations, the pitch of the corrugations or the material is selected; thus, the natural frequencies can be further easily determined so as to meet the natural frequencies requirements; and, the enhanced strength or durability of the sealing mechanism can be achieved in response to the environment conditions regarding the bellows-joints.

A preferable embodiment according to the present invention is a steam turbine comprising an outer turbine casing, an inner turbine casing housed in the outer turbine casing, a rotor shaft housed in the inner turbine casing, a plurality of rotor blades arranged at predetermined intervals in an axial direction of the rotor shaft, a plurality of stator blades provided inside the inner turbine casing, each of the stator blades being arranged between adjacent two of the rotor blades, a bearing arranged outside the outer turbine casing so as to rotation-freely support the rotor shaft, a gland for preventing steam leak provided in a location at which the rotor shaft penetrates the outer turbine casing, and a sealing mechanism according to the outer turbine casing and the gland of the present invention.

Thus, according to the above-described embodiment, applying the sealing mechanism to the rotor shaft of the steam turbine can surely prevent steam from leaking outward from the space around the rotor shaft between the outer turbine casing and the gland, and it is possible to avoid the resonance between the sealing mechanism and the rotor shaft.

Based on the sealing mechanism according to the present invention, the sealing mechanism comprises a bellows-joint surrounding a to-be-sealed shaft body and connected to a pair of support members arranged around the to-be-sealed shaft body on both ends thereof, the sealing mechanism hermetically sealing an area around the to-be-sealed shaft body while absorbing relative displacement between the pair of support members, wherein the bellows-joint includes an outer bellows-joint and an inner bellows-joint nested in the outer bellows-joint so that the inner and outer bellows-joints are arranged concentrically with respect to the to-be-sealed shaft body, each of the outer and inner bellows-joints is manufactured by corrugating a metal plate, and the outer and inner bellows-joints are arranged so as not to come in contact with each other.

Thus, the natural frequencies of the sealing mechanism can be adjusted in a simple manner without surplus expenditure; and, the resonance between the sealing mechanism and the to-be-sealed shaft body can be evaded. Further, the durability of the sealing mechanism according to the present invention is not inferior to that according to the conventional technology using the bellows-joint of a double layer type; thus, the present invention provides the steal mechanism of a long life.

Further, based on the steam turbine provided with the sealing mechanism according to the present invention, the steam turbine comprises, an outer turbine casing, an inner turbine casing housed in the outer turbine casing, a rotor shaft housed in the inner turbine casing, a plurality of rotor blades arranged at predetermined intervals in an axial direction of the rotor shaft, a plurality of stator blades provided inside the inner turbine casing, each of the stator blades being arranged between two adjacent rotor blades, a bearing arranged outside the outer turbine casing so as to rotation-freely support the rotor shaft, a gland for preventing steam leak provided in a location at which the rotor shaft penetrates the outer turbine casing, and a sealing mechanism according to any one of claims 1 to 4 which is arranged between the outer turbine casing and the gland.

Thus, a steam turbine according to the present invention is provided with the sealing mechanism according to the present invention as described above; therefore, the steam leakage outward from the space around the rotor shaft between the outer turbine casing and the gland can be surely prevented, and it is possible to avoid the resonance between the sealing mechanism and the rotor shaft.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.
(First Embodiment)

Figure 1:
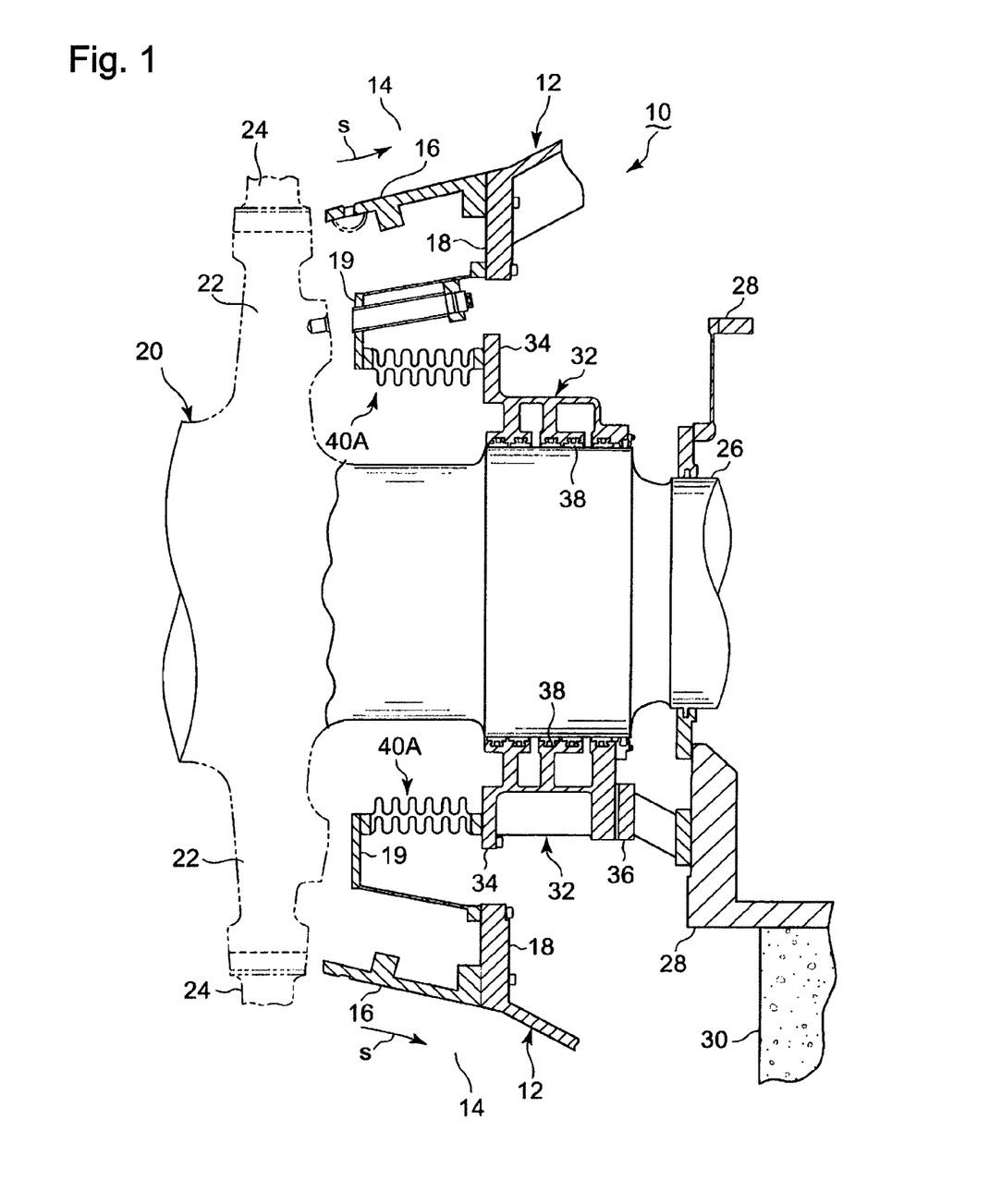
FIG. 1 shows a cross-section regarding a rotor and a rotor shaft of a steam turbine and the neighborhood thereof, a sealing mechanism being applied to the steam turbine, according to a first embodiment of the present invention.
Figure 2:
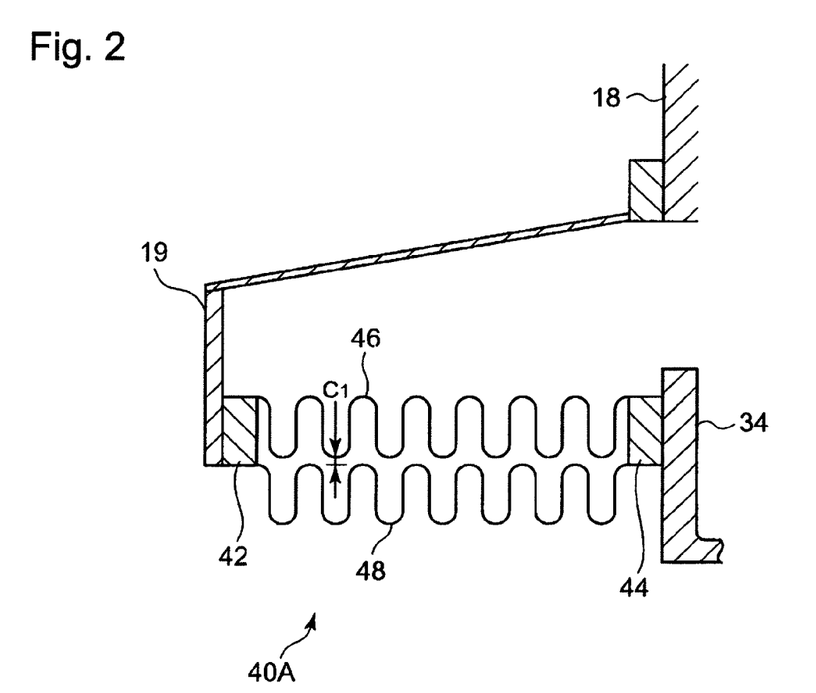
FIG. 2 shows a cross-section regarding the sealing mechanism according to the first embodiment.

With reference to FIGS. 1 and 2, the detail of the first embodiment of the present invention is now explained; thereby, a sealing mechanism according to a first embodiment is applied to a steam turbine. Firstly, based on FIG. 1, the configuration on the steam exhaust side of the low-pressure steam turbine 10 is explained. As shown in FIG. 1, an outer turbine casing 12 is provided so as to surround a rotor 20; in the outer turbine casing 12, a flow guide 16 forms an exhaust hood 14 through which low-pressure steam 's' is discharged, the steam 's' being the steam having been used for making the rotor rotate; and, the flow guide 16 is fitted to a support member 18.

As shown in FIG. 1, the final stage rotator comprises a rotor 20, a disc 22 and a plurality of rotor blades 24; thereby, the disc 22 and the rotor blades 24 are integrated into one body as a part of the rotor 20. Just on the upstream side of the rotor blades 24, a plurality of stator blades (not shown) provided on the final stage stator (not shown) that is fixed to the inner casing (that is not shown, however, is inside of the whole outer turbine casing as usual (cf. another Patent Reference JP3831617 etc.)) is arranged. A rotor shaft 26 as an extended part of the rotor 20 is rotation freely supported by a bearing pad (not shown) provided inside of the bearing housing 28 that is placed outside of the outer turbine casing 12; and, the bearing housing 28 is fixed on a foundation 30 made of concrete or the like.

A gland (shaft seal part) 32 is arranged between the outer turbine casing 12 and the bearing housing 28 so as to prevent steam from leaking through the gap between the rotor shaft 26 and the outer turbine casing 12. In usual practices, a part of low pressure steam that has been used for rotating the rotor and streams in the exhaust hood 14 is guided to the gland 32 in order to shut the steam leakage through the gap; incidentally, the steam guided to the gland 32 is called sealing steam. A casing 34 that covers the gland 32 is connected to the bearing housing 28 via a connecting member 36. Inside of the gland 32, a labyrinth seal 38 is provided so as to surround the rotor shaft 26 and form a labyrinth gap passage to evade steam leakage through the gap.

A shield wall 19 is connected to the support member 18 of the outer turbine casing 12; in order to close a space around the rotor shaft between the shield wall 19 and the casing 34 of the gland 32, as well as, in order to prevent steam from escaping outside of the space, a sealing mechanism 40A is provided according to the first embodiment. The configuration of the sealing mechanism 40A is hereafter explained with reference to FIG. 2.

In FIG. 2, onto the surface of the shield wall 19 on the side of the gland 32, an end flange 42 is gas-tightly fixed by means of welding or bolt-fastening; and, onto the surface of the casing 34 on the side of the shield wall 19, an end flange 44 is gas-tightly fixed by means of welding or bolt-fastening. As shown in FIG. 2, the end flanges have a rectangular cross-section.

An outer bellows-joint 46 and an inner bellows-joint 48 are inserted between the end flanges 42 and 44 and attached thereto, by means of welding or bolt fastening; each bellows-joint is manufactured by corrugating a metal plate (a to-be-corrugated membrane) formed in a cylindrical shape, the metal plate being made of a single kind of metal material. Each of the left end and the right end of the outer bellows-joint 46 is gas-tightly welded to the outer edge of the end flange 42 or 44; each of the left end and the right end of the inner bellows-joint 48 is gas-tightly welded to the inner edge of the end flange 42 or 44. Further, in order to evade the contact between the outer bellows-joint 46 and the inner bellows-joint 48, a distance (a gap) $C_1$ in the radial direction between the innermost radius of the outer bellows-joint 46 and the outermost radius of the inner bellows-joint 48 is provided. For instance, the distance $C_1$ is not shorter than 0.1 mm so that the both the joints do not come in contact with each other even when the sealing mechanism 40A is vibrated.

According to the first embodiment, an appropriate distance is put between the outer bellows-joint 46 and the inner bellows-joint 48 so that the contact between both the joints can be always evaded; while the conventional manner accompanies the difficulty that the natural frequencies of the sealing mechanism vary case by case, the present invention can overcome the difficulty. Thus, it becomes easy to design the natural frequencies of the sealing mechanism 40A under the condition that the sealing mechanism 40A is installed in the steam turbine and the turbine is operated. In other words, the natural frequencies of the sealing mechanism 40A can be easily established in advance so that the natural frequencies are apart from those of the rotor shaft 26. Further, different from the sealing mechanism disclosed by Patent Reference, no special arrangement means for arranging the natural frequencies of the sealing mechanism, in this embodiment. Accordingly, this embodiment improves cost effectiveness.

Further, each of the outer bellows-joint 46 and the inner bellows-joint 48 is gas-tightly connected to the end flanges 42 and 44; thus, the sealing effect according to this embodiment is equal to the sealing effect according to the conventional sealing mechanism where the bellows-joint of a double layer type is applied.

Further, according to the present invention, the outer bellows-joint 46 is connected to the outer edge of the end flange 42 or 44; and, the inner bellows-joint 48 is connected to the inner edge of the end flange 42 or 44; thus, both the bellows-joints 46 and 48 are fastened to the shield wall 19 and the casing 34 via either of the end flanges 42 and 44. Accordingly, the bellows-joints 46 and 48 are easily positioned without mutual contact.

As described thus far, the design of the natural frequencies regarding the sealing mechanism 40A is easily performed with accuracy; thus, the process of re-manufacturing the sealing mechanism 40A becomes unnecessary; further, the vibration tests to confirm that the resonance between the bellows-joint vibrations and the rotor shaft vibrations is evaded at a time point after the sealing mechanism 40A and rotor shaft 26 are assembled.

(Second Embodiment)

Figure 3:
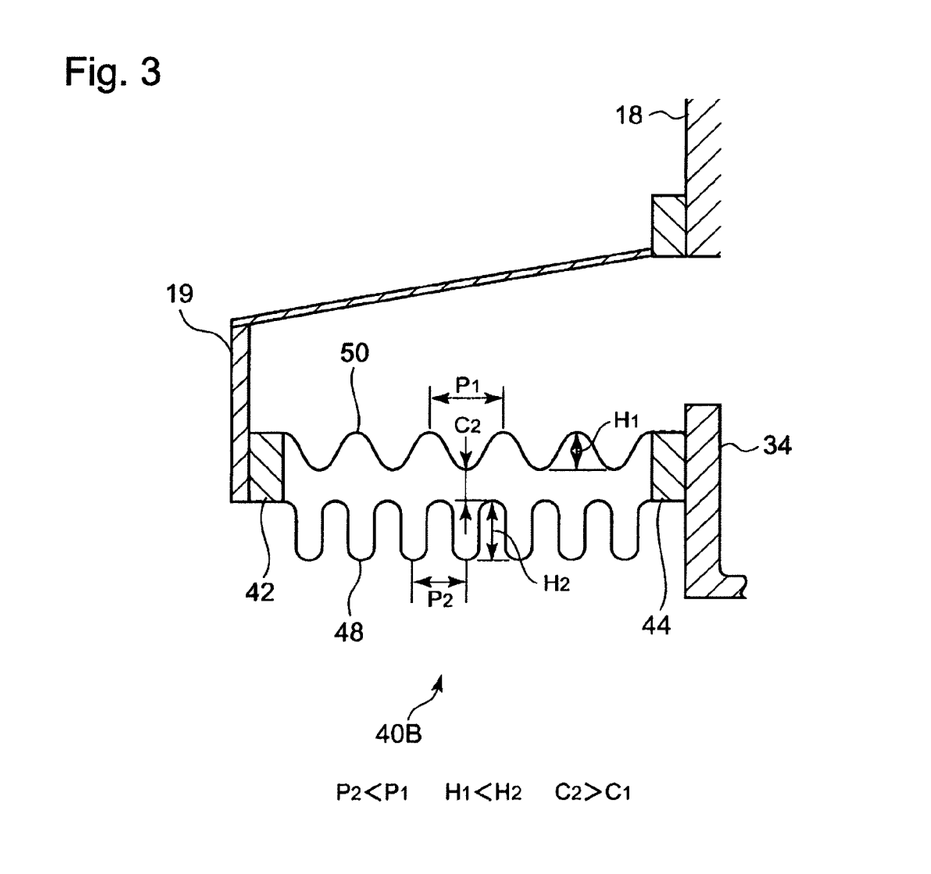
FIG. 3 shows a cross-section regarding the sealing mechanism according to the second embodiment.

In the next place, a sealing mechanism according to a second embodiment of the present invention is now explained with reference to FIG. 3. In the first embodiment, as for the corrugation of bellows of both the outer bellows-joint 46 and the inner bellows-joint 48, the thickness (of the membrane), the number of corrugations, the amplitude of corrugation, the pitch of corrugation and the metal material of the membrane are assumed to be fixed. In a sealing mechanism 40B according to the second embodiment, it is assumed that the thickness, the corrugation number, the corrugation amplitude, the corrugation pitch and the membrane material may be different between an outer bellows-joint 50 and the inner bellows-joint 48. Apart from this point, the configuration (including the fitting approaches regarding the bellows-joints) of this second embodiment is the same as that of the first embodiment. This second embodiment is applied to the rotor shaft 26 of the low-pressure steam turbine 10.

In more detail, the amplitude $H_1$ and the pitch $P_1$ regarding the outer bellows-joint 50 are determined so that the relations $P_2 < P_1$ and $H_1 < H_2$ are hold where $P_2$ and $H_2$ are the pitch and the amplitude regarding the outer bellows-joint 48. Incidentally, as just described, the amplitude regarding the outer bellows-joint 50 is smaller than the amplitude regarding the inner bellows-joint 48. In addition, a distance (a gap) $C_2$ in the radial direction between the innermost radius of the outer bellows-joint 50 and the outermost radius of the inner bellows-joint 48 is provided; thereby, the distance $C_2$ is taken so as to be longer than the distance $C_1$ in the first embodiment. Further, the stainless steel (JIS SUS310 or SUS410) that has fine characteristics in heat resistance property is used as the membrane material regarding the inner bellows-joint 48 that is exposed to elevated temperatures; and, the chromium steel (JIS SCr) that has fine characteristics in anti-corrosion property is used as the membrane material regarding the outer bellows-joint 50.

As described above, according to the second embodiment, the specifications of the outer bellows-joint 50 are prescribed, differently from those of the inner bellows-joint 48, in response to the specific requirement or the environment factor regarding each specification item by item; in this way, the design of natural frequencies can be further easily performed; in addition, the life of the sealing mechanism can be prolonged. Naturally, in this second embodiment, the membrane thickness of the outer bellows-joint 50 may be varied from that of the inner bellows-joint 48.

Industrial Applicability

According to the present invention, a sealing mechanism can be realized whereby the design regarding the natural frequencies of the sealing mechanism can be easily performed; and, the vibration resonance between the sealing mechanism and the to-be sealed rotor shaft can be surely evaded. The sealing mechanism is suitably applied to a steam turbine so as to seal the area around the gland of the rotor shaft in the steam turbine.

The invention claimed is:

1. A sealing mechanism for hermetically sealing a shaft body and absorbing relative displacement, the sealing mechanism comprising:
   a pair of space forming rings which face each other and are configured for surrounding the shaft body, wherein the pair of space forming rings are respectively arranged on end surfaces of support members facing each other;
   an outer bellows-joint having one end connected to an outer periphery of one of the space forming rings and another end connected to an outer periphery of the other of the space forming rings; and
   an inner bellows-joint having one end connected to an inner periphery of one of the space forming rings and another end connected to an inner periphery of the other of the space forming rings,
   wherein the inner bellows joint is nested in the outer bellows-joint, and the inner bellows-joint and the outer bellows-joint are arranged concentrically with respect to the shaft body,
   wherein each of the inner bellows joint and the outer bellows joint is a corrugated plate, and wherein the space forming rings space the inner bellows joint and the outer bellows-joint apart from each other such that the inner bellows joint and the outer bellows joint do not come in contact with each other.

2. The sealing mechanism of claim 1, wherein an outermost end of the inner bellows joint is closer to a center of the sealing mechanism in a radial direction of the space forming rings than an innermost end of the outer bellows-joint.

3. The sealing mechanism of claim 1, wherein at least one of plate thickness, the number of corrugations, pitch of the corrugations, and material of the outer bellows joint is different from that of the inner bellows-joint.

4. A steam turbine comprising:
a rotor;
an outer turbine casing surrounding the rotor;
a rotor shaft which extends from the rotor;
a gland for preventing steam leaking, the gland being disposed in a location at which the rotor shaft penetrates the outer turbine casing; and
the sealing mechanism of claim 1 arranged between the outer turbine casing and the gland.

5. A steam turbine comprising:
a rotor;
an outer turbine casing surrounding the rotor;
a rotor shaft which extends from the rotor;
a gland for preventing steam leaking, the gland being disposed in a location at which the rotor shaft penetrates the outer turbine casing; and
the sealing mechanism of claim 1 arranged between the outer turbine casing and the gland,
wherein one of the space forming rings is connected to the outer turbine casing and the other of the space forming rings is connected to the gland, and the sealing mechanism hermetically seals an area around the rotor shaft.

6. The steam turbine of claim 5, wherein the sealing mechanism absorbs relative displacement between the outer turbine casing and the gland.

7. The steam turbine of claim 5, wherein an outermost end of the inner bellows-joint is closer to a center of the sealing mechanism in a radial direction of the space forming rings than an innermost end of the outer bellows-joint.

8. The steam turbine of claim 5, wherein a plate thickness of the outer bellows joint is different from a plate thickness of the inner bellows-joint.

9. The steam turbine of claim 5, wherein a number of corrugations of the outer bellows joint is different from a number of corrugations of the inner bellows-joint.

10. The steam turbine of claim 5, wherein a pitch of the corrugations of the outer bellows joint is different from a pitch of the corrugations of the inner bellows-joint.

11. The steam turbine of claim 5, wherein a material of the outer bellows-joint is different from a material of the inner bellows-joint.

12. The sealing mechanism of claim 1, wherein a plate thickness of the outer bellows-joint is different from a plate thickness of the inner bellows-joint.

13. The sealing mechanism of claim 1, wherein a number of corrugations of the outer bellows-joint is different from a number of corrugations of the inner bellows-joint.

14. The sealing mechanism of claim 1, wherein a pitch of the corrugations of the outer bellows-joint is different from a pitch of the corrugations of the inner bellows-joint.

15. The sealing mechanism of claim 1, wherein a material of the outer bellows-joint is different from a material of the inner bellows-joint.

16. A steam turbine comprising:
a rotor;
an outer turbine casing surrounding the rotor;
a rotor shaft which extends from the rotor;
a gland for preventing steam leaking, the gland being disposed in a location at which the rotor shaft penetrates the outer turbine casing; and
the sealing mechanism of claim 6 arranged between the outer turbine casing and the gland with the space forming rings surrounding the rotor shaft,
wherein one of the space forming rings is connected to the outer turbine casing and the other of the space forming rings is connected to the gland, and the sealing mechanism hermetically seals an area around the rotor shaft,
wherein the sealing mechanism absorbs relative displacement between the outer turbine casing and the gland, and
wherein at least one of plate thickness, the number of corrugations, pitch of the corrugations, and material of the outer bellows joint is different from that of the inner bellows-joint.

* * * * *